US008911292B2

(12) United States Patent
Brune

(10) Patent No.: US 8,911,292 B2
(45) **Date of Patent: *Dec. 16, 2014**

(54) GAMING SYSTEM AND METHOD PROVIDING BALANCED PAYBACKS WITH VARYING WAGER AMOUNTS

(71) Applicant: IGT, Las Vegas, NV (US)

(72) Inventor: Christopher T. Brune, Carson City, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,149

(22) Filed: Aug. 19, 2013

(65) Prior Publication Data

US 2013/0331171 A1 Dec. 12, 2013

Related U.S. Application Data

(63) Continuation of application No. 12/618,140, filed on Nov. 13, 2009, now Pat. No. 8,523,662.

(51) Int. Cl.
*A63F 13/00* (2014.01)
*G07F 17/32* (2006.01)

(52) U.S. Cl.
CPC .................................. *G07F 17/3267* (2013.01)
USPC ................... 463/25; 463/12; 463/13; 463/16; 463/17; 463/19; 463/20; 463/26; 463/28

(58) Field of Classification Search
USPC .................. 463/16–22, 25–28, 39–43, 12–13
See application file for complete search history.

(56) References Cited

U.S. PATENT DOCUMENTS

| | | | |
|---|---|---|---|
| 4,624,459 | A | 11/1986 | Kaufman |
| 4,743,022 | A | 5/1988 | Wood |
| 4,837,728 | A | 6/1989 | Barrie et al. |

(Continued)

FOREIGN PATENT DOCUMENTS

| | | |
|---|---|---|
| AU | 771847 | 8/2000 |
| GB | 2 072 395 | 2/1981 |

(Continued)

OTHER PUBLICATIONS

Fort Knox, Article written by Strictly Slots, published in Apr. 2005, 1 pg.

(Continued)

*Primary Examiner* — Sunit Pandya
(74) *Attorney, Agent, or Firm* — Neal, Gerber & Eisenberg LLP

(57) ABSTRACT

Various embodiments of the gaming system of the present disclosure enable a player to play a secondary or bonus game, in which the player has the chance to play for a designated award in the triggered secondary or bonus game. The probability of triggering the secondary or bonus game varies based on the player's primary game wager. Additionally, the probability of winning a designated award in the triggered secondary or bonus game varies based on the player's primary game wager. In one embodiment, as the primary game wager increases, the odds of triggering the secondary or bonus game increase, but not in direct proportion to the wager. Similarly, the odds of winning the designated award in the triggered secondary or bonus game increases, but not in direct proportion to the wager.

26 Claims, 8 Drawing Sheets

(56) References Cited

U.S. PATENT DOCUMENTS

| | | | |
|---|---|---|---|
| 4,991,848 | A | 2/1991 | Greenwood et al. |
| 5,123,649 | A | 6/1992 | Tiberio |
| 5,248,142 | A | 9/1993 | Breeding |
| 5,280,909 | A | 1/1994 | Tracy |
| 5,344,144 | A | 9/1994 | Cannon |
| 5,364,104 | A | 11/1994 | Jones et al. |
| 5,377,973 | A | 1/1995 | Jones et al. |
| 5,393,067 | A | 2/1995 | Paulsen et al. |
| 5,494,287 | A | 2/1996 | Manz |
| 5,542,669 | A | 8/1996 | Charron et al. |
| 5,544,892 | A | 8/1996 | Breeding |
| 5,570,885 | A | 11/1996 | Ornstein |
| 5,718,431 | A | 2/1998 | Ornstein |
| 5,743,800 | A | 4/1998 | Huard et al. |
| 5,766,076 | A | 6/1998 | Pease et al. |
| 5,788,574 | A | 8/1998 | Ornstein et al. |
| 5,823,874 | A | 10/1998 | Adams |
| 5,839,730 | A | 11/1998 | Pike |
| 5,848,932 | A | 12/1998 | Adams |
| 5,851,148 | A | 12/1998 | Brune et al. |
| 5,855,515 | A | 1/1999 | Pease et al. |
| 5,885,158 | A | 3/1999 | Torango et al. |
| 5,890,962 | A | 4/1999 | Takemoto |
| 5,951,397 | A | 9/1999 | Dickson |
| 5,976,015 | A | 11/1999 | Seelig et al. |
| 5,989,121 | A | 11/1999 | Sakamoto |
| 5,997,400 | A | 12/1999 | Seelig et al. |
| 6,110,043 | A | 8/2000 | Olsen |
| 6,146,273 | A | 11/2000 | Olsen |
| 6,155,925 | A * | 12/2000 | Giobbi et al. .................. 463/20 |
| 6,159,097 | A | 12/2000 | Gura |
| 6,186,894 | B1 | 2/2001 | Mayeroff |
| 6,210,275 | B1 | 4/2001 | Olsen |
| 6,213,877 | B1 | 4/2001 | Walker et al. |
| 6,224,483 | B1 | 5/2001 | Mayeroff |
| 6,227,969 | B1 | 5/2001 | Yoseloff |
| 6,231,442 | B1 | 5/2001 | Mayeroff |
| 6,312,334 | B1 | 11/2001 | Yoseloff |
| 6,358,147 | B1 | 3/2002 | Jaffe et al. |
| 6,425,823 | B1 | 7/2002 | Byrne |
| 6,435,511 | B1 | 8/2002 | Vancura et al. |
| 6,514,141 | B1 | 2/2003 | Kaminkow et al. |
| 6,517,073 | B1 | 2/2003 | Vancura |
| 6,565,436 | B1 | 5/2003 | Baerlocher |
| 6,589,115 | B2 | 7/2003 | Walker et al. |
| 6,599,193 | B2 | 7/2003 | Baerlocher et al. |
| 6,634,943 | B1 | 10/2003 | Baerlocher |
| 6,692,003 | B2 | 2/2004 | Potter et al. |
| 6,702,289 | B1 | 3/2004 | Feola |
| 6,726,565 | B2 | 4/2004 | Hughs-Baird |
| 7,029,395 | B1 | 4/2006 | Baerlocher |
| 7,070,505 | B2 | 7/2006 | Vancura et al. |
| 7,297,059 | B2 | 11/2007 | Vancura et al. |
| 7,326,115 | B2 | 2/2008 | Baerlocher |
| 7,329,179 | B2 | 2/2008 | Baerlocher |
| 7,351,146 | B2 | 4/2008 | Kaminkow |
| 7,357,716 | B2 | 4/2008 | Marks et al. |
| 7,387,570 | B2 | 6/2008 | Randall |
| 7,393,278 | B2 | 7/2008 | Gerson et al. |
| 7,465,227 | B2 | 12/2008 | Baerlocher |
| 7,470,184 | B2 | 12/2008 | Baerlocher et al. |
| 7,470,185 | B2 | 12/2008 | Baerlocher |
| 7,828,643 | B2 | 11/2010 | Baerlocher |
| 7,976,378 | B2 | 7/2011 | Baerlocher |
| 8,092,299 | B2 | 1/2012 | Cohen et al. |
| 2003/0060266 | A1 | 3/2003 | Baerlocher |
| 2003/0144053 | A1 | 7/2003 | Michaelson |
| 2004/0048644 | A1 | 3/2004 | Gerrard et al. |
| 2004/0063492 | A1 | 4/2004 | Baerlocher et al. |
| 2004/0259625 | A1 | 12/2004 | Randall |
| 2005/0054429 | A1 | 3/2005 | Baerlocher et al. |
| 2005/0060050 | A1 | 3/2005 | Baerlocher |
| 2005/0096123 | A1 | 5/2005 | Cregan et al. |
| 2005/0282625 | A1 | 12/2005 | Nicely |
| 2006/0025195 | A1 | 2/2006 | Pennington et al. |
| 2006/0030399 | A1 | 2/2006 | Baerlocher |
| 2006/0030403 | A1 | 2/2006 | Lafky et al. |
| 2006/0046816 | A1 | 3/2006 | Walker et al. |
| 2006/0128457 | A1 | 6/2006 | Cannon |
| 2006/0183535 | A1 | 8/2006 | Marks et al. |
| 2006/0223615 | A1 * | 10/2006 | Englman ........................ 463/17 |
| 2007/0054726 | A1 | 3/2007 | Muir et al. |
| 2007/0054733 | A1 | 3/2007 | Baerlocher |
| 2007/0060271 | A1 | 3/2007 | Cregan et al. |
| 2007/0060321 | A1 | 3/2007 | Vasquez et al. |
| 2007/0184887 | A1 | 8/2007 | Cannon |
| 2007/0218982 | A1 | 9/2007 | Baerlocher |
| 2007/0298875 | A1 | 12/2007 | Baerlocher et al. |
| 2008/0039191 | A1 | 2/2008 | Cuddy |
| 2008/0090651 | A1 | 4/2008 | Baerlocher |
| 2008/0102934 | A1 | 5/2008 | Tan |
| 2008/0108410 | A1 | 5/2008 | Baerlocher |
| 2008/0108423 | A1 | 5/2008 | Benbrahim et al. |
| 2008/0108425 | A1 | 5/2008 | Oberberger |
| 2008/0108430 | A1 | 5/2008 | Evans |
| 2008/0108431 | A1 | 5/2008 | Cuddy et al. |
| 2008/0113779 | A1 | 5/2008 | Cregan |
| 2008/0119283 | A1 | 5/2008 | Baerlocher |
| 2008/0132320 | A1 | 6/2008 | Rodgers |
| 2008/0182650 | A1 | 7/2008 | Randall et al. |
| 2008/0182655 | A1 | 7/2008 | DeWaal et al. |
| 2008/0214292 | A1 | 9/2008 | Bryant et al. |
| 2008/0274790 | A1 | 11/2008 | Cannon |
| 2008/0300050 | A1 | 12/2008 | Tessmer et al. |
| 2008/0318668 | A1 | 12/2008 | Ching et al. |
| 2009/0042645 | A1 | 2/2009 | Graham et al. |
| 2009/0069073 | A1 | 3/2009 | Gerrard et al. |
| 2009/0088244 | A1 | 4/2009 | Nicely et al. |
| 2009/0088252 | A1 | 4/2009 | Nicely et al. |
| 2009/0088253 | A1 | 4/2009 | Oberberger et al. |
| 2009/0104977 | A1 | 4/2009 | Zielinski |
| 2009/0111561 | A1 | 4/2009 | Dewaal et al. |
| 2009/0111573 | A1 | 4/2009 | Iddings |
| 2009/0124316 | A1 | 5/2009 | Baerlocher et al. |
| 2009/0124362 | A1 | 5/2009 | Cuddy et al. |
| 2009/0124363 | A1 | 5/2009 | Baerlocher et al. |
| 2009/0124364 | A1 | 5/2009 | Cuddy et al. |
| 2009/0143133 | A1 | 6/2009 | Baerlocher |
| 2009/0291744 | A1 | 11/2009 | Chan |

FOREIGN PATENT DOCUMENTS

| | | |
|---|---|---|
| GB | 2 097 570 | 4/1982 |
| GB | 2 152 262 | 7/1985 |
| GB | 2 181 589 | 4/1987 |
| GB | 2 204 436 | 11/1988 |
| GB | 2 316 214 | 2/1998 |

OTHER PUBLICATIONS

Party Time Razzle Dazzle Brochure, written by IGT, published in 1999, 2 pgs.

* cited by examiner

FIG. 4

200

| Primary Game Wager Amount (credits) (202) | Bonus Game Trigger Frequency (or Bonus trigger probability level) (204) | Starting Points (206) | Primary Game Average Expected Payback (%) (208) | Increment Average Expected Payback (%) (210) | Bonus Game Average Expected Payback (%) (212) | Progressive Award Average Expected Payback (%) (214) | Total Average Expected Payback (%) (216) |
|---|---|---|---|---|---|---|---|
| 60 | 125/25,000 | 0 | 63.3 | 6 | 2.3 | 19.7 | 91.3 |
| 120 | 223/25,000 | 5 | 63.3 | 6 | 4 | 18.2 | 91.5 |
| 180 | 301/25,000 | 10 | 63.3 | 6 | 5.4 | 17.0 | 91.7 |
| 240 | 366/25,000 | 15 | 63.3 | 6 | 6.6 | 16.1 | 92.0 |
| 300 | 416/25,000 | 25 | 63.3 | 6 | 7.5 | 15.7 | 92.5 |

FIG. 5A

| | Progressive Level | Start-up Value (Dollars) | Increment Rate (%) | Points Required to Trigger Progressive Win |
|---|---|---|---|---|
| 60f | Progressive Award Level #6 | 200,000 | .25 | 250 |
| 60e | Progressive Award Level #5 | 20,000 | .5 | 100 |
| 60d | Progressive Award Level #4 | 10,000 | 1.00 | 75 |
| 60c | Progressive Award Level #3 | 2,500 | 1.25 | 50 |
| 60b | Progressive Award Level #2 | 1,000 | 1.5 | 40 |
| 60a | Progressive Award Level #1 | 500 | 1.5 | 30 |

| Progressive Level | Current Value | Points to Trigger Progressive Win |
|---|---|---|
| Progressive Award Level #6 | $201,534.10 | 250 |
| Progressive Award Level #5 | $21,250.80 | 100 |
| Progressive Award Level #4 | $13,685.20 | 75 |
| Progressive Award Level #3 | $3,550.25 | 50 |
| Progressive Award Level #2 | $2,014.52 | 40 |
| Progressive Award Level #1 | $1,002.68 | 30 |

60f, 60e, 60d, 60c, 60b, 60a

GAMING SYSTEM AND METHOD PROVIDING BALANCED PAYBACKS WITH VARYING WAGER AMOUNTS

PRIORITY CLAM

This application is a continuation of, and claims priority to and the benefit of, U.S. patent application Ser. No. 12/618,140, filed on Nov. 13, 2009, the entire contents of which are incorporated herein by reference.

COPYRIGHT NOTICE

A portion of the disclosure of this patent document contains or may contain material which is subject to copyright protection. The copyright owner has no objection to me photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

Secondary or bonus games are also known in gaming machines. Secondary or bonus games usually do not require an additional wager by the player to be activated and provide an additional award, such as a bonus award, to the player. In certain known gaming machines, secondary or bonus games are activated or triggered upon an occurrence of a symbol or symbol combination in the primary or base game. For instance, a symbol occurring on the payline on the third reel of a three reel sot machine may initiate a secondary bonus game. That is, these gaming machines include symbol-driven secondary or bonus games which are triggered by the gaming machine. It should be appreciated that since these are game defined symbols or symbol combinations, the frequency and payouts are determined by the games design and thus are considered an integral part of the game and the characteristic of the game.

The awards provided for such secondary or bonus games are calculated into or taken into account in the total average expected payback of the gaming machine. Thus, the total average expected payback or the total gaming machine return of such known gaming machines is the average expected payback of the primary or base game plays plus the average expected payback of the secondary or bonus game plays.

In designing such secondary or bonus games, game designers must calculate the frequency at which the bonus game is triggered from the base game and the contribution of the bonus game to the overall average expected payback of the gaming machine. Another factor which must be considered in the game design is whether large awards will be offered in the bonus game. Providing large awards in the bonus game is attractive to players. However, if the bonus game contribution to the overall average expected payback is too high, the average expected payback from the base game must be reduced. Reducing the average expected payback for the base game can be frustrating for players who do not obtain or often obtain a bonus game trigger. However, to keep the base game average expected payback high, the frequency at which the bonus game is triggered must often be reduced.

Games in which the bonus game includes high awards require either reducing the frequency of the bonus game trigger or lowering the average expected payback of the base game. If the bonus game is infrequently triggered and the base game has a low average expected payback, players may lose interest in the game or their gaming sessions may end prior to triggering the on game. On the other hand, increasing the frequency at which the bonus game is triggered and reducing the size of the bonus game awards can lead to a less interesting game where triggering the bonus game is a routine event.

When the bonus game triggering event is tied directly to specific events in the base game, the frequency with which the bonus game is triggered is difficult to adjust because such changes in the bonus trigger frequency bring significant change to the overall average expected payback of the gaming machine. Another disadvantage of such games where the bonus game is driven by or triggered from the base game is that bonus game play ensues only after the outcome of the base game is known, thereby reducing opportunities for surprise and entertainment.

Certain known gaming machines provide mystery triggered bonus games, which are triggered without any apparent reason to the player. That is, these gaming machines trigger and display a mystery bonus game (and provide a player any mystery bonus award in the mystery bonus game) independent of any displayed event in or based specifically on any of the displayed plays of any base game. Such mystery bonus awards typically account for a smaller contribution to the total gaming machine return and are considered separate from the primary or base game these mystery bonus games are said to sit on top of any existing primary or base games and any existing symbol-driven bonus games).

Certain known slot machines adjust the odds of winning awards, such at progressive awards, in bonus games based upon the number of coins or credits wagered. One known way to accomplish this is by adjusting the probability of triggering the bonus game in direct proportion linearly) to the wager. If a player wagers 1 credit, the player has a 1 in 25,000 chance of triggering the bonus game. If the player wagers 5 credits, the player has a 5 in 25,000 chance of triggering the bonus game. Once the bonus game is triggered, the odds of winning in the bonus game are static regardless of the wager amount placed.

Another known method for adjusting the odds of winning awards in bonus games is the reverse of the above method. The odds of triggering the bonus game are static and remain unchanged based on the wager. However, once in the bonus game, the probability of winning in the bonus game varies in direct proportion with the wager.

There is a continuing need to provide new and different gaming machines and gaming systems, as well as new and different ways to vary the probability of winning one or more designated awards.

SUMMARY

Various embodiments of the present disclosure provide a gaming system and method which enables a player wagering more on a primary game to have better odds of reaching a secondary or bonus game, wherein the secondary or bonus game enables the player to play for at least one designated award, such as a progressive award. Additionally, as the players primary game wager amount increases, the gaming system provides the player with better odds of winning awards the triggered secondary or bonus game, including the designated award. In one embodiment, as the primary game wager amount increases, the odds of triggering the secondary or bonus game increase, but not in direct proportion to the wager amount. Similarly, the odds of winning the designated award in the triggered secondary or bonus game increases, but not in direct proportion to the wager amount.

In operation of one embodiment, the gaming system enables a player to place one of plurality of different primary game wager amounts on a play of a primary game. The gaming system employs a probability level et a secondary or bonus game triggering event occurring (hereinafter sometimes referred to as a bonus trigger probability level), wherein the probability level employed is based on the placed primary game wager amount. In other words, the probability of triggering the secondary or bonus game varies based on the wager level at which the player is wagering. The gaming system determines whether the secondary or bonus game triggering event occurs in accordance with the employed probability level of the secondary or bonus game triggering event occurring. In one such embodiment, the gaming system causes the bonus event triggering condition to occur independent of any displayed event in any play of the primary game. If the gaming system determines that the bonus game triggering event has not occurred, the gaming system continues providing pays of the primary game upon primary game wagers placed by the player. If the gaming system determines that the bonus game triggering event does occur, the gaming system employs a probability level of winning a designated bonus award in the triggered secondary or game (hereinafter sometimes referred to as a bonus award probability level), wherein the probability level employed is based on the placed primary game wager amount. The gaming system determines whether to provide the player with the designated bonus award in the secondary or bonus game in accordance with the employed probability level of winning, the designated bonus award. If the determination is to provide the designated bonus award, the gaming system provides the designated bonus award to the player.

In one embodiment, the bonus trigger probability level increases with increased primary game wager amounts. Additionally, the bonus award probability level increases as the primary game wager amount increases. In one such embodiment, as the primary game wager amount increases, each of the bonus trigger probability level and bonus award probability level increases, but not in direct proportion to the wager amount.

In one embodiment, as the player's primary game wager amount increases, the gaming system employs an increased probability level of a bonus game triggering event occurring, where the bonus game triggering event is not based on any displayed event in any play of the primary game. In another embodiment, as the players primary game wager amount increases, the gaming system employs an increased probability level of triggering the secondary or bonus game by enabling a bonus game triggering event that was not previously enabled, where the bonus game triggering event is not based on any displayed event in any play of the primary game. In this manner, the gaming system of the present disclosure enables increasing the probability of a player reaching a secondary or bonus game based on the player's wager in the primary game, without affecting the underlying primary game. In various embodiments, as the player's primary game wager increases, the gaming system employs one or both of an increased probability level of a bonus game triggering event occurring based on a primary game event and an increased probability level of a bonus game triggering event occurring independent of any displayed event in any play of the primary game.

In one embodiment, the designated award or awards include one or more progressive awards. In one embodiment, the gaming system maintains a plurality of progressive awards in an MLP configuration. Each of the progressive awards of the MLP configuration starts at a different initial, start-up, or reset value level, such as $100, $500, and $1000. Each progressive award individually increments based on a portion or percentage of wagers placed on plays of the primary games until that progressive award is provided to a player. Upon an occurrence of a bonus game triggering event, a bonus game is triggered in which a player has the chance to play for at least one of the progressive awards. Based on the result of the bonus game, zero, one or more of the progressive may be provided to the player. In this embodiment, the odds of triggering the bonus game vary based on the players primary game wager. Additionally, the odds of winning a progressive award in the triggered bonus game vary based on the player's primary game wager. In one such embodiment, as the primary game wager level increases, the probability of triggering the bonus game increases, but not in direct proportion to the wager. Additionally, the probability of winning a progressive award in the triggered bonus game increases, but not in direct proportion to the wager.

In one example embodiment, the bonus game includes one or more free activations of a game. In this example embodiment, each of the progressive awards of the MLP configuration is associated with a number of characteristics, such as a number of points, which must be accumulated during the free activations of the game to provide the player that progressive award. For example, a first progressive award is associated with ten accumulated points and a second progressive award is associated with thirty accumulated points. In this example, if a player were to accumulate a total of ten points as a result of the free activations, the player would be provided the first progressive award (in addition to any bonus awards won during the free activations), and if the player were to accumulate thirty points as a result of the free activations, the player would be provided the second progressive award (in addition to any bonus awards won during the free activations).

In this embodiment, the gaming system selects the odds of triggering the free activations bonus game based on a player's primary game wager amount. Additionally, the gaming system selects the odds of winning one of the progressive awards in the triggered free activations bonus game based on the player's primary game wager amount. In one example embodiment the gaming system selects the odds of winning one of the progressive awards in the triggered free activations bonus game by selecting a number of initial points to provide to the player prior to or upon commencing the free activations bonus game. In this example, the initial number of points provided to the player varies based on the player's primary game wager amount, but is not directly proportional (i.e., not linearly related) to the wager amount. For example, a first wager amount is 60 credits; a second wager amount is 120 credits; a third wager amount is 180 credits; a fourth wager amount is 240 credits; and a fifth wager amount is 300 credits. If the player wagers 60 credits on the primary game (i.e., wagers at a first wager level), the gaming system provides the player a $125/25{,}000$ chance of triggering the free activations bonus game, and the gaming system provides the player with zero initial points for the free activations bonus game, if it is triggered. If the player wagers 120 credits on the primary game (i.e., wagers at a second wager level), the gaming system provides the player a $223/25{,}000$ chance of triggering the free activations bonus game, and the gaming system provides the player with 5 initial points for the free activations bonus game, if it is triggered. If the player wagers 300 credits on the primary game (i.e., wagers at a fifth wager level), the gaming system provides the player a 416/25,000 chance of triggering the free activations bonus game, and the gaming system provides the player with 25 initial points for the free activations bonus game, if it is triggered. It should be appreciated that providing the player with an initial number of points for the triggered free activations bonus game gives the player an advantage or head start in meeting a requirement or threshold for obtaining one of the levels of the MLP. It should also be appreciated that, although the wager amounts of this example increase linearly, the probability of triggering the bonus game increases non-linearly relative to the wager. Similarly, the probability of winning one of the progressive awards in the bonus game (e.g., the number of initial points provided to the player for the bonus game) increases non-linearly relative to the wager.

In an alternative embodiment, rather than giving the player an advantage or head start in meeting a requirement or threshold for obtaining one of the levels of the MLP, the gaming system reduces or lowers the requirement or threshold for obtaining one of the levels of the MLP. In one example embodiment, as the player's primary game wager amount increases, the gaming system reduces the number of points required for obtaining one or more of the levels of the MLP configuration, wherein the reduction is based on the player's primary game wager amount, but not in direct proportion to the wager amount. For instance, as the primary game wager amount increases, the number of points required to obtain a progressive award decreases, but not in direct proportion to the wager amount. By reducing the number of points required to win a progressive award based on a player's wager, the gaming system enables players who bet more to have a better chance of gaining enough points to win a progressive award in the triggered bonus game.

It is therefore an advantage of the present disclosure to provide a gaming system where players who are willing to wager more receive better odds of winning a designated award.

Another advantage of the present disclosure is to provide a gaming system where players wagering larger amounts per game have a greater chance of reaching a bonus game than players wagering smaller amounts per game. One in the bonus game, players who wager more have a greater chance of winning a designated award.

A further advantage of the present disclosure is to apportion what is paid back to the player among multiple alternative means for distributing awards to the player.

Additional features and advantages are described in, and will be apparent from, the following Detailed Description and the figures.

BRIEF DESCRIPTION OF THE FIGURES

FIG. 4 is a table illustrating an example embodiment of the gaming system disclosed herein, wherein the bonus game trigger frequency, the probability of winning a designated award in the bonus game, and the relative portions of the bonus game average expected payback and the designated award average expected payback vary as a function of the primary game wager amount.

FIG. 5A is a table illustrating an association between a plurality of progressive award levels, a plurality of progressive award start-up values, a plurality of progressive award increment rates, and a plurality of progressive award triggering events.

DETAILED DESCRIPTION

The present disclosure may be implemented in various configurations for gaming machines, gaming devices or gaming systems, including but not limited to: (1) a dedicated gaming machine, gaming device or gaming system wherein the computerized instructions for controlling any games (which are provided by the gaming machine or gaming device) are provided with the gaming machine or gaming device prior to delivery to a gaming establishment; and (2) a changeable gaming machine, gaming device or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
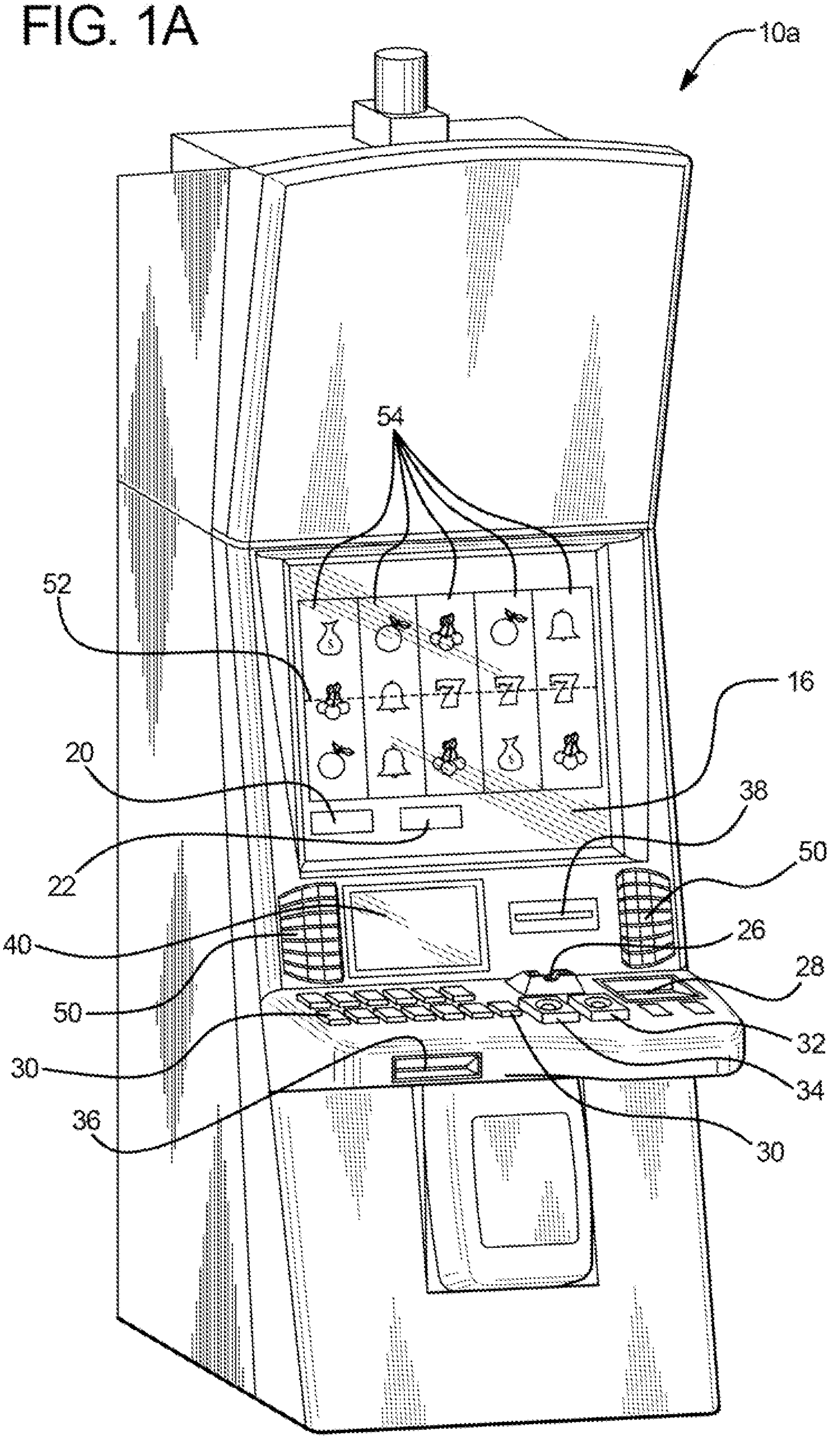
FIG. 1A is a front-side perspective view of one embodiment of the gaming device disclosed herein.
Figure 1B:
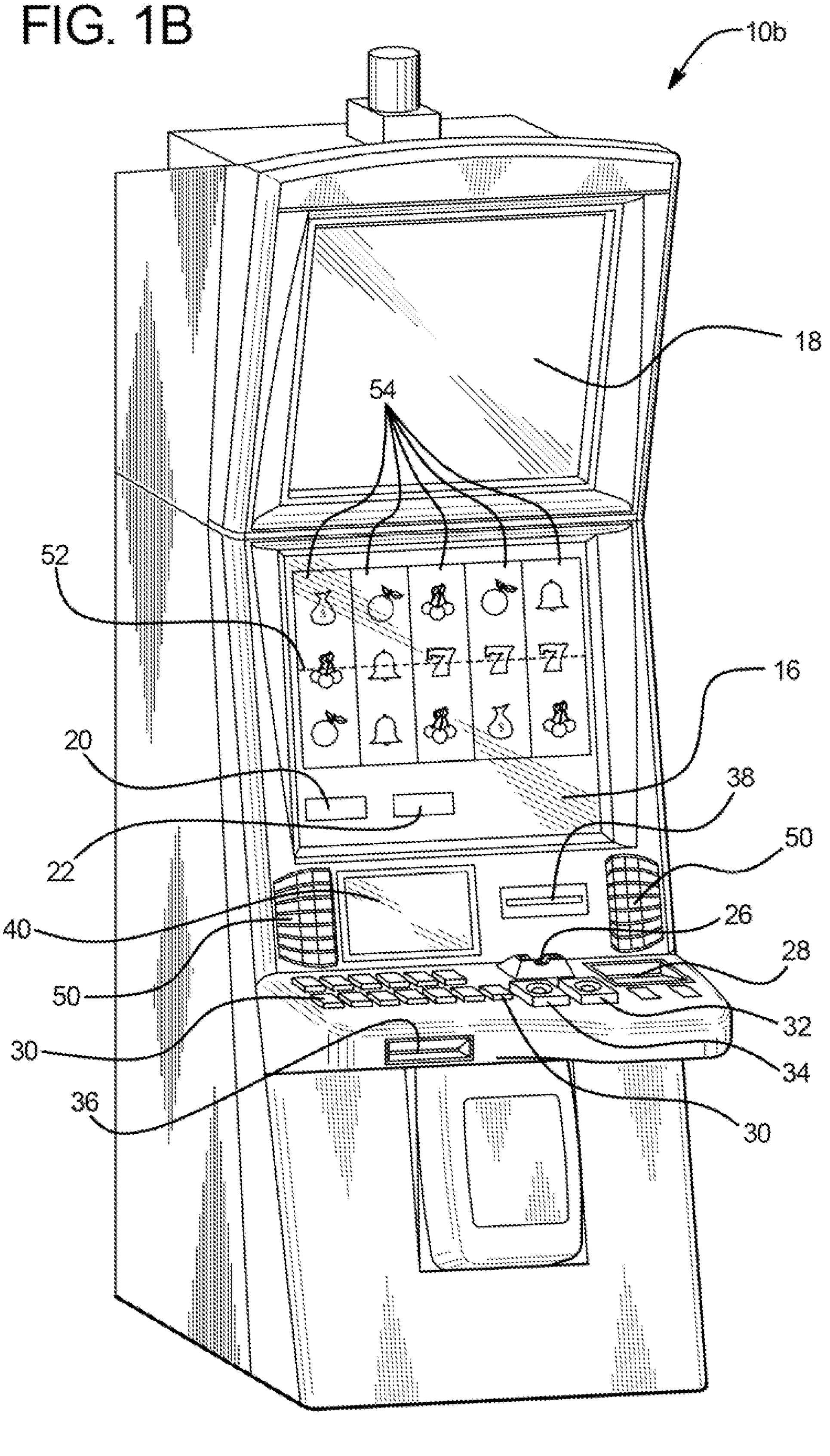
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it white standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
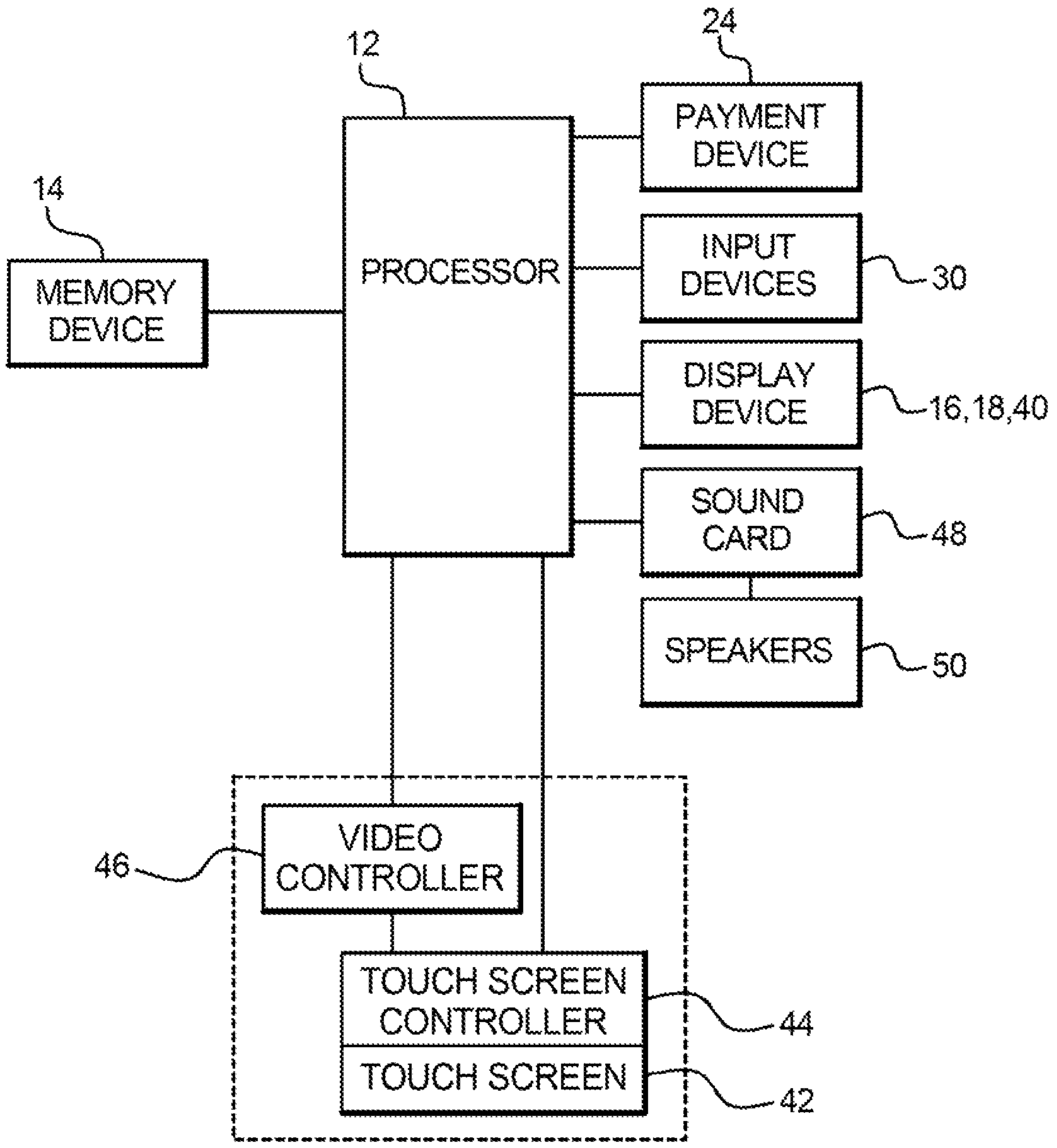
FIG. 2A is a schematic block diagram of the electronic configuration of one embodiment of the (laming device disclosed herein.

In one embodiment, as illustrated FIG. 2A, the gaming device preferably includes at least one processor 12, as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or it formation and applicable game rules that relate to the pay of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment part or all of the program code and/or operating data described above can be stored in a detachable or removable memory device, including, but not limited to, a suitable cartridge, disk, CD ROM, DVD or USB memory device. In other embodiment part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once fledged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the (laming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max, button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit, slip to provide to the player. The player receives the ticket or credit slip and may redeem the value associated with the ticket or credit slip via a cashier or other suitable redemption system). In another embodiment, when the player cashes out, the player receives the coins or tokens in a coin payout tray. It should be appreciated that any suitable payout mechanisms, such as funding to the players electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaining device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol dame, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reef 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, than each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e. 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining it any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated active symbol positions (i.e., as opposed to being based on how many paylines that would have passed through each of the strings of related symbols in active symbol positions).

In one embodiment a base or primary game may be a poker game wherein the gaming device enables the player to play a conventional game of video draw poker and initially deals five cards all face up from a virtual, deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are, provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the players selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example if the player has been unsuccessful at qualifying through other specified activities. In another embodiment, the player must make a separate side-wager on the bonus game of wager a designated amount in the primary game to qualify for the secondary game. In this embodiment, the secondary game triggering event must occur and the side-wager (or designated primary game wager amount) must have been placed to trigger the secondary game.

Figure 2B:
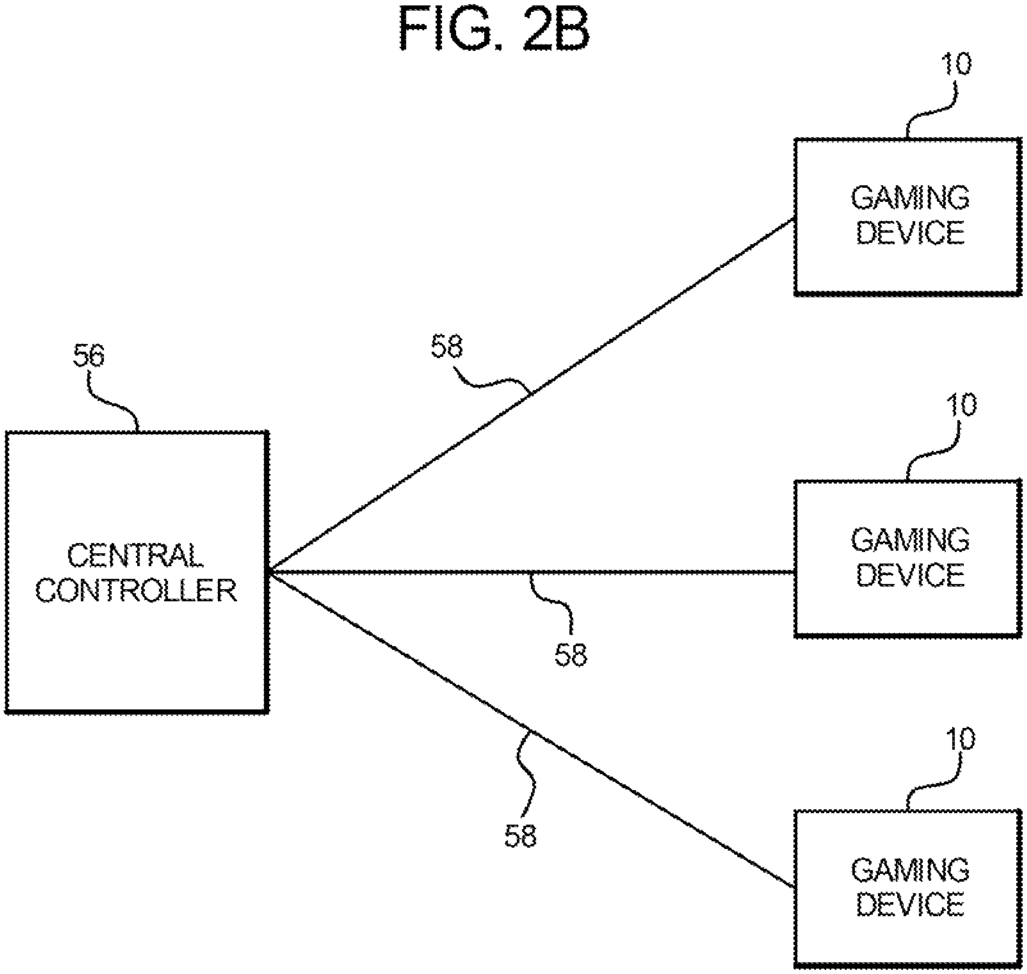
FIG. 2B is a schematic block diagram illustrating a plurality of gaming devices in communication with a central controller.

In one embodiment, as illustrated in FIG. 2B, one or more of the gaming devices 10 are in communication with each other and/or at least one central server, central controller or remote host 56 through a data network or remote communication link 58. In this embodiment the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined time outcome value determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner, if the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming devices provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a reel-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaining device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding pay for that gaming session. In another embodiment, rather than requiring a player to insert a player tracking card, the gaming device utilizes one or more portable devices carried by a player, such as a cell phone, a radio frequency identification tag or any other suitable wireless device to track when a payer begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time the wagers are placed. In different embodiments, for one or more players, the player tracking system includes the player's account number, the player's card number, the players first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment the plurality of gaming devices may be located in a different part of the gaming establishment or within a different gaming establishment than the off-site central server or controller. Thus, the WAN may include an oft-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the gaming system disclosed herein is implemented via a data network, such as an Internet or intranet. In one such embodiment, the operation of a gaming device can be viewed at the gaming device with at least one internet browser. In another such embodiment, the operation of a gaming device can be viewed at a location remote from the gaming device or gaming establishment utilizing at least one Internet browser. In these embodiments, operation of the gaming device may be accomplished with only a connection to the central server or controller (i.e., an internet/intranet server) through a conventional phone or other data transmission line, digital subscriber line (DSL), T-1 line, coaxial cable, fiber optic cable, or other suitable connection. Accordingly, players may access an internet game page from any location where an internet connection and computer, or other internet facilitator is available. It should be appreciated that the expansion in the number of computers and number and speed of internet connections in recent years increases opportunities for players to play from an ever-increasing number of remote sites. It should be further appreciated that enhanced bandwidth of digital wireless communications may render such technology suitable for some or all communications, particularly if such communications are encrypted. Higher data transmission speeds may be useful for enhancing the sophistication and response of the display and interaction with the player.

In one embodiment, the central server (i.e., an internet/intranet server) maintains at least one dedicated gaming site which is associated with one or more progressive awards and one or more supplemental funds as disclosed herein. In operation, a player fogs onto the dedicated gaming site and the central server enables the player to wager on and participate in one or more online games at this gaming site. In this embodiment, upon the occurrence of any progressive award increase event, the central server adds a value or amount (from the maintained supplemental fund) to one or more of the progressive awards associated with the dedicated gaming site.

In one embodiment, to regulate and monitor the play of games over the internet, player's identifications are verified through credit card authentication. Through this authentication, the gaming system verifies the player, the player's age, the player's location and any other suitable information associated with the player. In one such embodiment, the gaming system utilizes the verified location information to monitor and ensure that the player in a certain location follows any applicable gaming regulations associated with that location. In another such embodiment, the gaming system utilizes the verified location information to set up different progressive awards for different regions. In this embodiment, different progressive awards are allotted per region.

In another embodiment including game play over the internet, the gaming system stores information about one or more players. In this embodiment, after a player has enrolled or identified themselves with the gaming system (via the dedicated gaming site), the gaming system stores their information, such as credit card information, preferred options, player number name, or any other information in a database. In one such embodiment, the gaming system enables the player to set and store one or more gaming options, such as jackpot betting, side wagering, and preferred games, associated with the dedicated gaming site.

As mentioned above, in one embodiment the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaining devices in the gaming system. Such different games may include the same or substantially the same game play with different pay tablet. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program device or a component (e.g., a microchip to be inserted in a gaming device), writing the game program on a disc or other media, downloading or streaming the game program over a dedicated data network, intent or a telephone line. After the stored game programs ire communicated from the central server, the local processor executes the communicated program to facilitate play of the communicated program by a player through the display device(s) and or input device(s) of the gaming device. That is, when a game program is communicated to a local processor, the local processor changes the game or type of game played at the gaming device.

In another embodiment a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment a plurality of players at a plurality of linked gaming devices play for one or more awards wherein an outcome generated by one gaming device affects the outcomes generated by one or more linked gaming device.

Balancing Paybacks with Varying Wager Amounts

Figure 3:
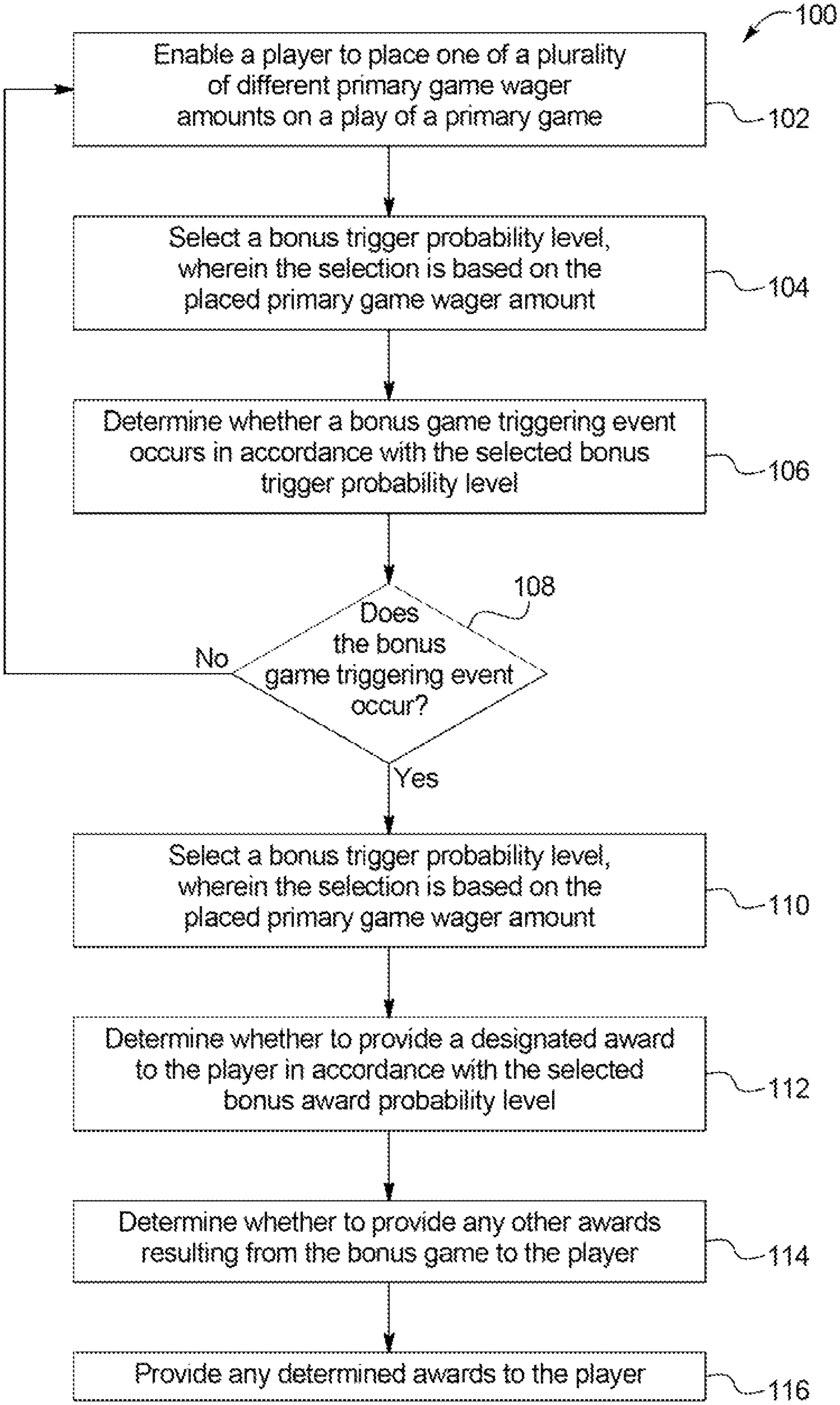
FIG. 3 is a flowchart of one example process for one embodiment of the naming system disclosed herein.

Referring now to FIG. 3, one embodiment of the gaming system of the present disclosure operates according to sequence 100. In one embodiment, the process 100 is embodied in one or more software programs stored in one or more memories executable by one or more processors, such as the controller of the gaming system.

In the illustrated embodiment, the gaming system enables a player to place one of a plurality of different primary game wager amounts on a play of a primary game, as indicated by block 102. As seen in the table 200 of FIG. 4, the first column 202 lists a plurality of different primary game wager amounts. For example, a first primary game wager amount is 60 credits; a second primary game wager amount is 120 credits; a third primary game wager amount is 180 credits; a fourth primary game wager amount is 240 credits; and a fifth primary game wager amount is 300 credits. In this example, if a player wagers 60 credits on the primary game, the player is wagering the first primary game wager amount (or at a first primary game wager level). If the player wagers 180 credits on the primary game, the player is wagering the third primary game wager amount (or at a third primary game wager level). In this embodiment, a player may place any wager amount on the primary game. That is, the player is not limited to making a wager of 60, 120, 180, 240, or 300 credits. Thus, the table 200 of FIG. 4 shows only a sampling of the different primary game wager amounts that may be placed by a player on a play of the primary game. However, it should be appreciated that, in other embodiments, the gaming system only enables the player to place one of a plurality of available wager amounts, such as the wager amounts listed in table 200 of FIG. 4, on the primary game. In other words, the player cannot make a wager of an amount that is in between the available wager amounts.

Referring back to FIG. 3, after the player places a primary game wager amount, the gaming system selects or employs a probability level of a bonus triggering event occurring, wherein the probability level selected is based on the placed primary game wager amount, as indicated by block 104. The probability level of the bonus triggering event occurring (or the bonus trigger probability level) varies based on the placed primary game wager amount (or the wager level at which the player is wagering). In one embodiment, the bonus trigger probability level varies based on the placed wager amount, but not in direct proportion to the placed wager amount. For example, as seen in the table 200 of FIG. 4, each of the plurality of different primary game wager amounts of the first column 202 is associated with a different bonus triggering frequency bonus trigger probability level), as indicated in the second column 204. If the player places a primary game wager amount of 60 credits, the gaming device selects or employs a bonus trigger probability level of $^{125}/_{25,000}$. If the player places a primary game wager amount of 120 credits, the gaming device selects or employs a bonus trigger probability level of $^{223}/_{25,000}$. Thus, as the payer's wager increases to certain wager levels or thresholds, the bonus trigger probability level increases in a non-linear manner. It should be appreciated that, in an alternative embodiment, rather than increasing the numerator of the bonus trigger probability level as the wager increases, the denominator of the bonus trigger probability level decreases as the wager increases. For example, if the player places a primary game wager amount of 60 credits, the gaming device selects or employs a bonus trigger probability level of $^{125}/_{25,000}$. If the player places a primary game wager amount of 120 credits, the gaming device selects or employs a bonus trigger probability level of $^{125}/_{12,517}$.

Referring back to FIG. 3, the gaming system determines whether the bonus game triggering event occurs in accordance with the selected bonus trigger probability level, as indicated by block 106.

In one such embodiment, the gaming system causes a bonus event triggering event or condition to occur independent of any displayed event in any play of any game of the gaming device of the gaming system. In another embodiment, the gaming system causes a bonus event triggering event or condition to occur based on the occurrences of one or more suitable events occurring at or in association with one or more players and/or one or more gaming devices in the gaming system. In another embodiment the gaming system causes a bonus event triggering event or condition to occur based at least in part on a displayed event in a play of one or more displayed games of one or more of the gaming devices in the gaming system, wherein the probability of the bonus triggering event occurring is based on the player's primary game wager. In one example embodiment as the player's primary game wager increases, a number of bonus symbols may be added to the primary game to increase the probability of triggering the bonus game through primary game play, in addition to the probability of triggering the bonus game through an event that occurs independent of the primary game. In this embodiment, the number of bonus symbols added to the primary game varies based on the player's primary game wager amount.

Referring back to FIG. 3, if the gaming system determines that the bonus game triggering event has not occurred at diamond 108, the gaming system continues providing plays of the primary game upon primary game wagers placed by the player, as indicated by block 102.

If the gaming system determines that a bonus game triggering event does occur, the gaming system selects or employs a probability level of winning a designated award, such as a progressive award, in the triggered bonus game, wherein the probability level selected is based on the placed primary game wager amount, as indicated by block 110. As the player's primary game wager increases, the probability of winning the designated award in the triggered bonus game (i.e., the bonus award probability level) increases based on the primary game wager amount. For example, as illustrated in the example embodiment of FIG. 4, the gaming system provides the player with an initial number of points prior to or upon entering the bonus game wherein the initial number of points provided is based on the placed primary game wager amount. In this example embodiment, the initially provided points give the player an advantage or a head start in accumulating enough points to win a designated award in the bonus game, as discussed below. For each of the primary game wager amounts hated in the first column 202 of the table 200, there is a corresponding number of initial points, as indicated by the third column 206 of the table 200. If the player places a primary game wager amount of 60 credits, the gaming system provides the player with 0 initial points for the bonus game. If the player places a primary game wager amount of 120 credits, the gaming system provides the player with 5 initial points for the bonus game. If the player places a primary game wager amount of 300 credits, the gaming system provides the player with 25 initial points for the bonus game. Thus, in this example, the number of initial points provided to the player for the triggered bonus game (and, as a result, the bonus award probability level) varies based on the placed primary game wager amount, but not in direct proportion to the wager amount. In certain embodiments, the different numbers of points associated with the different wager amounts are displayable to a player, such as upon a player request, to give the player a visible indication of the advantage associated with wagering larger amounts.

Referring back to FIG. 3, after the gaming system selects the bonus award probability level based on the placed primary game wager amount, the gaming system determines whether to provide the player with the designated award in accordance with the selected bonus award probability level, as indicated by block 112. The gaming system determines whether to provide the player with any other awards resulting from the bonus game, as indicated by block 114. The gaming system provides any determined awards to the player, as indicated by block 116.

Accordingly, gaming system of the present disclosure provides player wagering more in the primary game to have better odds of reaching a bonus game, wherein the secondary or bonus game enables the player to play for a designated award, such as a progressive award. Additionally, as the player's wager increases, the gaming system provides better odds of winning in the triggered bonus game.

Referring back to the table 200 of FIG. 4, the last column 216 of the table 200 shows the total average expected payback percentage the overall return to the player) for each primary game wager amount. The total average expected payback percentage is determined by adding up what the player can expect to be paid, on average, from each of the different portions of the game. For example, each of the following contributes to the total average expected payback percentage: (i) the primary game average expected payback 208; (ii) the increment average expected payback 210 (i.e., based on a percentage of the wagered amount that funds the designated bonus award or progressive award); (iii) the bonus game average expected payback 212 (i.e., from winning awards in the bonus game, which are not the designated bonus award or progressive award); and (iv) the progressive award overage expected payback 214. For example, if a player wagers 120 credits, the total average expected payback percentage for that wager level is 91.5%, where 63.3% of that total percentage is from the primary game average expected payback; 6% of that total percentage is from the increment average expected payback; 4% of that total percentage is from the bonus game average expected payback; and 18.2% of that total percentage is from the progressive award average expected payback. If a player wagers 300 credits the total average expected payback percentage for that wager level is 92.5%, where 63.3% of that total percentage is from the primary game average expected payback; 6% of that total percentage is from the increment average expected payback; 7.5% of that total percentage is from the bonus game average expected payback; and 15.7% of that total percentage is from the progressive award average expected payback.

The example of FIG. 4 illustrates how, through an interrelated adjustment of the bonus trigger frequency and the probability of winning the designated award in the triggered bonus game (which, in the illustrated example, is accomplished through the gifting of points), the present disclosure enables a greater degree of flexibility in adjusting the relative portions (or percentages) that the bonus game average expected payback and the progressive award average expected payback contribute to the total average expected payback as a function of the primary game wager amount.

In one embodiment, the gaming system adjusts the bonus game trigger frequency as a function of the primary game wager by employing an increased probability level of a bonus game triggering event occurring, as the player's primary game wager increases, where the bonus game triggering event is not based on any displayed event in any play of the primary game. In another embodiment, as the player's primary game wager increases, the gaming system employs an increased probability level of triggering the secondary or bonus game by enabling a bonus game triggering event that was not previously enabled, were the bonus game triggering event is not based on any displayed event in any play of the primary game, such as a mystery bonus trigger. In this manner, the gaming system of the present disclosure enables increasing the probability of a player reaching a secondary or bonus game based on the player's primary game wager, without affecting the underlying primary game. The underlying primary game and the award of payouts based upon the paytable of the primary game do not change based on the primary game wager.

For example, as seen in table 200 of FIG. 4, the average expected payback percentage of the primary game remains the same, regardless of the primary game wager amount placed by the player. For each of the primary game wager amounts in column 202, the average expected payback percentage for the primary game remains constant at 63.3%. In an alternative embodiment, it may be possible to change or modify the primary game, such as by adding more bonus symbols or reducing the number of bonus symbols in the primary game, to increase the probability of triggering the bonus game through primary game play, in addition to the probability of triggering the bonus game through an event that occurs independent of the primary game.

As seen in table 200 of FIG. 4, a player wagering 60 credits on the primary game has a $^{125}/_{25,000}$ chance of triggering the bonus game. Also, once the bonus is triggered, the gaming system provides the player 0 points for the bonus game. The amount that the bonus game average expected payback contributes to the total average expected payback is 2.3%. The amount that the progressive average expected payback contributes to the total average expected payback is 19.7%. A player wagering 300 credits on the primary game has a $^{416}/_{25,000}$ chance of triggering the bonus game. Also, once the bonus is triggered, the gaming system provides the player 25 points for the bonus game. The bonus game average expected payback makes up 7.5% of the total average expected payback, and the progressive average expected payback makes up 15.7% of the total average expected payback.

The above comparison shows that, for a player wagering 60 credits the bonus game average expected payback makes up a smaller portion of the total average expected payback than for a player wagering, for example, 300 credits. This is because, on average, players who wager more will trigger the bonus game more frequently than players who wager less. Thus, players wagering at higher levels will have more opportunities to play for and win awards in the bonus game. Therefore, as illustrated in the table 200 of FIG. 4, as a player's primary game wader increases, the bonus game average expected payback contributes a larger amount to the total average expected payback. In other words, for placing a higher wager, the bonus game average expected payback will form a larger part of the overall or total average expected payback for a player.

The above comparison also shows that, for a player wagering 60 credits, the progressive average expected payback makes up a larger portion of the total average expected payback than for a player wagering 300 credits. A player who wagers more obtains a larger number of points for the bonus game (and thus a better chance of winning one of the progressive awards in the bonus game). However, once in the bonus game, lower and mid-level progressive awards are more likely to be triggered than higher level progressive awards. Since the player wagering 300 credits is wagering significantly more than the player wagering 60 credits, progressive wins make up less of the overall return to the player wagering at the higher wager level. That is, in this example, as a player's primary game wager increases, the progressive average expected payback forms a smaller part of the overall or total average expected payback.

Accordingly, the example of FIG. 4 shows how, as the amount wagered on the primary game increases, the primary game average expected payback remains the same. However, wagering at increased wager levels results in an increased probability of winning a progressive award and improves the bonus game average expected payback.

Progressive Awards

Figure 5B:
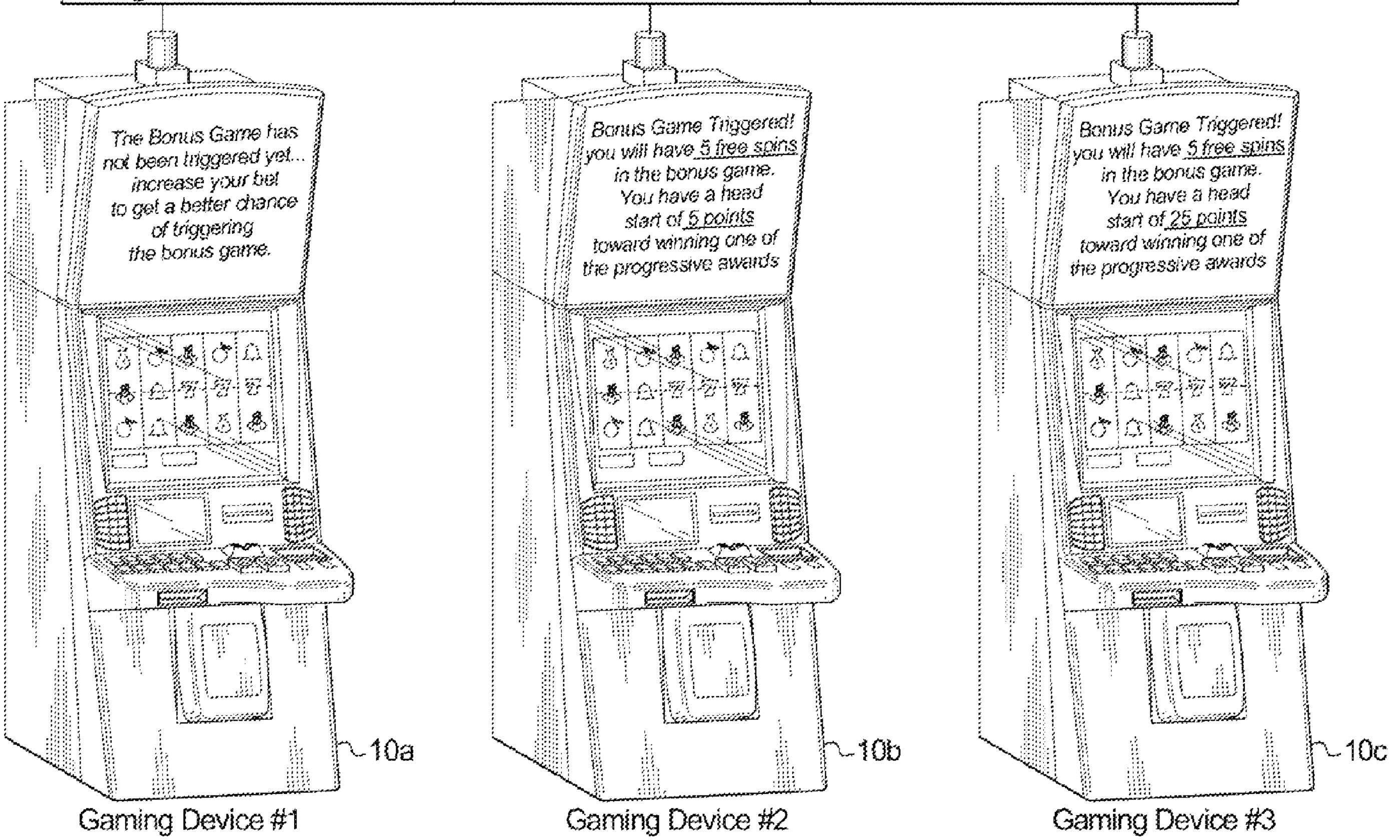
FIG. 5B is a schematic diagram of one embodiment of the gaming system disclosed herein illustrating the a plurality of gaming machines in communication with central server which maintains a plurality of progressive awards, wherein each gaming machine is played by a player.

Referring now to FIGS. 5A and 5B, in one example embodiment, the gaming system maintains a plurality of progressive awards in an MLP configuration. Upon an occurrence of a bonus game triggering condition, the gaming system enables one or more players playing at the gaming devices in the gaming system to play a bonus game in which each of the players has a chance to play for one or more of the progressive awards of the MLP configuration.

In one embodiment, the gaming system includes a central controller, central server or remote host, wherein a plurality of gaming devices 10*a*, 10*b*, 10*c* are in communication with or linked to the central controller through a data network or a remote communication link. The central controller may be any suitable server or computing device which includes a processor and a memory or storage device, in alternative embodiments, the central server is another gaming device in the gaming system. Each of the linked gaming devices 10*a*, 10*b*, 10*c* includes at least one primary game operable upon a wager by a player. The linked gaming devices 10*a*, 10*b*, 10*c* may have the same primary game or two or more different primary games.

In one embodiment, one, more or each of the plurality of progressive awards are maintained by the central controller of the gaming system. In another embodiment, one, more or each of the plurality of progressive awards are maintained by the individual gaming devices. In some embodiments, each individual gaming machine maintains one or more progressive awards of the MLP configuration and the central server simultaneously or substantially simultaneously maintains one or more progressive awards of the MLP configuration. In one such embodiment, the lower valued, more frequently triggered progressive awards of the MLP are maintained by the individual gaming machines and the higher valued, less frequently triggered progressive awards of the MLP are maintained by the central server. It should be appreciated that any suitable configuration of maintaining one, more or each of the plurality of progressive awards may be implemented in accordance with the gaming system disclosed herein.

In one embodiment, a master host site computer is in communication with or coupled to a plurality of the central servers at a variety of mutually remote gaming sites for providing a multi-site linked progressive automated gaming system. In one embodiment, a master host site computer may serve gaming devices distributed throughout a number of properties at different geographical locations including, for example, different locations within a city or different cities within a state. In one embodiment, the master host site computer is maintained for the overall operation and control of the system. In this embodiment, a master host site computer oversees all or part of the progressive gaming system and is the master for computing ail or part of the progressive jackpots. All participating gaming sites report to, and receive information from, the master host site computer. Each central server computer is responsible for all data communication between the gaming device hardware and software and the master host site computer.

In FIGS. 5A and 5B, each of the progressive awards is associated with a different one of a plurality of progressive award levels 60*a*, 60*b*, 50*c*, 60*d*, 60*e*, 60*f*. The progressive awards are each associated with a reset or start-up value. A first progressive award associated with a first progressive award level 60*a* of the MLP has an initial start-up value of 500 dollars; a second progressive award associated with a second progressive award level 60*b* of the MLP has an initial start-up value of 1,000 dollars; a third progressive award associated with a third progressive award level 60*c* of the MLP has an initial start-up value of 2,500 dollars; a fourth progressive award associated with a fourth progressive award level 60*d* of the MLP has an initial start-up value of 10,000 dollars; a fifth progressive award associated with a fifth progressive award level 60*e* of the MLP has an initial start-up value of 20,000 dollars a sixth progressive award associated with a sixth progressive award level 60*f* of the MLP has an initial start-up value of 200,000 dollars. The progressive awards individually increment or accumulate during game play based on different incrementing events until provided to one or more players upon a suitable triggering event. It should be appreciated that, in the illustrated example, the progressive values are displayed as dollar amounts. In various embodiments, the progressive award values could be displayed as a number of credits or in any other suitable manner.

In one embodiment, the progressive awards of the MLP accumulate based on a small percentage of coin-in or wagered amounts. In the example of FIG. 4, for each wagered amount, six percent (6%) of the players primary game wager funds the progressive awards of the MLP. Thus, the increment payback percentage is 6% for this example. It should be appreciated that this portion or percentage of the players wager does not go to the casino or game operator. Rather, this portion or percentage of the players wager funds one or more progressive awards which, at some point, are awarded to a player. Accordingly, the percentage of the players wager that funds the progressive awards (or the increment payback percentage) is factored into the total average expected payback percentage for a player.

As discussed above, in example of FIG. 4, the percentage of each wagered amount that funds the progressive awards is equal for each wagered amount (i.e., 6%). In other embodiments, the percentages of wagered amounts that fund one or more progressive awards are different for different wager amounts. In another embodiment, as discussed below, at least a fraction of one or more of the progressive awards of the MLP are funded by the gaming establishment, such as a casino, by using a starting value higher than zero to make the progressive awards attractive even after they are reset.

In one embodiment, different progressive awards associated with different levels of the MLP increment at different rates. For example, as illustrated in FIG. 5A, the first progressive award associated with the first progressive award level 60*a* of the MLP has an increment rate of 1.5%; the second progressive award associated with the second progressive award level 60*b* of the MLP has an increment rate of 1.5%; the third progressive award associated with the third progressive award level 60*c* of the MLP an increment rate of 1.25%; the fourth progressive award associated with the fourth progressive award level 60*c* of the MLP an increment rate of 1.0%; the fifth progressive award associated with the fifth progressive award level 60*c* of the MLP an increment rate of 0.5%; the sixth progressive award associated with the sixth progressive award level 60*c* of the MLP an increment rate of 0.25%. In other embodiments, the percentage that goes to each progressive award is equal such as 0.1% to each of the progressive award levels of the MLP).

In one embodiment, two or more of the progressive awards of the MLP are funded at different temporal rates. In this embodiment, the different progressive awards are incremented or funded in different increments of time wherein, until the progressive award hits, a set amount is added to the progressive award at each determined time increment. In another embodiment, two or more of the progressive awards may each be incremented or funded based on different incrementing factors or incrementors. In this embodiment, a first progressive award may increment each time a first incrementing factor occurs and a second progressive award may increment each time a second incrementing factor occurs, wherein the first incrementing factor and the second incrementing factor are different. Examples of incrementing factors could be a symbol-driven trigger in the base game, the occurrence of one or more events in a bonus game, the player betting a maximum amount, a percentage of possible gaming devices being actively played or in active status, or any other suitable method for defining an incrementor.

In one embodiment, different gaming devices in the gaming system have different progressive awards of the MLP available to the player. In one such embodiment, different types of gaming devices are associated with different types of progressive awards of the MLP based on the current configuration of the gaming system. In one embodiment, zero, one or more progressive awards of the MLP may be associated with each of the gaming devices in the gaming system while zero, one or more different progressive awards of the MLP may be associated with a plurality of, but not all of the gaming devices in the gaming system.

In one embodiment, one or more of the progressive awards of the MLP are each funded via a side bet or side wager associated with the primary game. In this embodiment a player must place or wager a side bet to be eligible to win the progressive award associated with the side bet. In one embodiment, the player must place the maximum bet and the side bet to be eligible to win one of the progressive awards of the MLP. In another embodiment, if the player places or wagers the required side bet, the player may wager at any credit amount on any payline (i.e., the player need not place the maximum bet and the side bet to be eligible to win one of the progressive awards).

In another embodiment, one or more of the progressive awards of the MLP are partially funded via a side-bet or side-wager which the player may make (and which may be tracked via a side-bet meter). In one embodiment, one or more of the progressive awards of the MLP are funded based on players wagers as described above as welt as any side-bets or side-wagers placed.

In one alternative embodiment, a minimum wager level is required for a gaming device to quality to be selected to obtain one of the progressive awards of the MLP. In one embodiment, this minimum wager level is the maximum wager level for the primary game in the gaming device. In another embodiment, this minimum wager level is placing a wager on all available paylines in a slot primary game or alternatively placing a wager on all available poker hands in a multi-hand poker primary game. In another embodiment, no minimum wager level is required for gaming device to qualify to be selected to obtain one of the progressive awards of the MLP.

As illustrated in FIGS. 5A and 5B, each of the progressive awards of the MLP configuration is associated with a number of characteristics, such as a number of points, which must be accumulated during the bonus game to provide the player that progressive award. For example, the first progressive award 60*a* of the MLP is provided when a player accumulates thirty points in the bonus game; the second progressive award 60*b* of the MLP is provided when a player accumulates forty points in the bonus game; and the third progressive award 60*c* of the MLP is provided when a player accumulates fifty points in the bonus game.

In one example embodiment, the bonus game includes a number of free activations of a game. In this embodiment, the probability of triggering the bonus game varies based on the primary game wager amount placed by the player on the primary game. If the bonus game is triggered, the gaming system provides a player a number of free activations of a game. For example, the gaming system provides a number of free spins or activations of one or more symbol generators, such as reels. In this example embodiment, the gaming system also provides the player with a number of initial points, wherein the number of initial points provided to the player in the bonus game is based on the primary game wager amount placed by the player.

For example, as seen in FIG. 58, the player of the first gaming device 10*a* has placed a primary game wager of 60 credits, as seen in table 200 of FIG. 4. For the first gaming device 10*a*, the bonus game has not been triggered. The gaming system informs the player at the first gaming device 10*a* that the player can increase the primary game wager amount to obtain a better probability of triggering the bonus game. The player of the second gaming device 10*b* has placed a primary game wager of 120 credits, as seen in table 200 of FIG. 4. For placing a higher wager amount, the gaming system employs a higher probability of triggering the bonus game for the player. As seen in FIG. 5C, the bonus game has been triggered for the second gaming device 10*b*. The gaming system provides the player at the second gaming device 10*b* with 5 free spins or activations for the bonus game. Based on the placed primary game wager amount, the gaming system provides the player of the second gaming device 10*b* with 5 points upon entering the bonus game. The player of the third gaming device 10*c* has placed a primary game wager of 300 credits, as seen in table 200 of FIG. 4. For placing an even higher wager amount, the gaming system employs a higher probability of triggering the bonus game for the player. The bonus game has also been triggered at the third gaming device 10*c*. The gaming system provides the player of gaming device 10*c* with 5 free spins or activations for the bonus game. Based on the placed primary game wager amount, the gaming system provides the player at the third gaming device 10*c* with 25 points upon entering the bonus game.

In one such embodiment, the plurality of symbol generators each include or are otherwise associated with a plurality of symbols. At least, one and preferably a plurality of the symbols include a designated symbol. Each designated symbol is associated with one or more characteristics, such as a number of points. For each provided free spin or activation of the symbol generators, the plurality of symbol generators each generate one or more symbols. The gaming system analyzes the generated symbols to determine if any winning symbol combinations are formed by the generated symbols. The gaming system provides the player with any awards associated with any winning symbol combinations formed by the generated symbols. The gaming system also determines whether the generated symbols include any designated symbols. For each generated designated symbol, the gaming device tracks or accumulates the number of points associated with the generated secondary symbol. When a bonus game terminating condition occurs or when the provided number of free activations have been used, the gaming device determines, based on the tracked or accumulated points and any initial points provided to the player upon triggering the bonus game, whether to provide the player any of the progressive awards. More specifically, the gaming vice determines whether the player's total number of points is equal to or greater than the number of points associated with one of the progressive awards. If the total number of points is equal to or greater than the number of points associated with one of the progressive awards, the gaming device provides the player that progressive award. For example, if the free activations bonus game resulted in 35 accumulated points, the gaming device provides the player the first progressive award (which is associated with 30 points). It should be appreciated that, as a player's wager reaches certain wager levels or thresholds, the gaming system provides a larger number of initial points for the bonus game. This, in turn, creases the chance that the player will win one of the progressive awards as a result of the bonus game.

In an alternative embodiment, the gaming device selects the probability level of winning one of the progressive award levels in the triggered bonus game by selecting a number of points required or obtaining one or more of the levels of the MLP configuration based on the player's primary game wager amount. In one such embodiment, as the player's wager reaches certain wager levels or thresholds the selected number of points required to obtain a progressive award decreases. For example, using the example of FIGS. 5A and 5B, for placing a wager of 120 credits, the player only has to accumulate 25 points in the bonus game, rather than 30 points, to win the first progressive award. By reducing the number of points required to win a progressive award based on the primary game wager, the gaming system enables players who bet more to have a better chance of gaining enough points to win a progressive award in the triggered bonus game. In another embodiment, a player starts out with a number of points in the bonus game and has to get down to zero to win one of the progressive awards. In one such embodiment, the gaming device selects a number of points that the player will initially have upon entering the bonus game based on the players primary game wager amount.

In certain embodiments, the gaming device enables a player to wager on and thus activate symbol positions. In one such embodiment, the symbol positions are associated with the reels. In this embodiment, if based on the player's wager, a reel is activated, then each of the symbol positions associated with that reel will be activated and each of the active symbol positions will be part of one or more of the ways to win. As the number of wagered-on reels (and, thus, the number of activated symbol positions) increases, the probability of triggering the bonus game increases. Additionally, as the number of wagered-on reels increases, the probability of winning in the triggered bonus game increases. In one embodiment, the probability of triggering the bonus game increases non-linearly relative to the number of wagered-on reels (or activated symbol positions). Similarly, the probability of winning in the triggered bonus game increases non-linearly relative to the number of wagered-on reels or activated symbol positions).

In one embodiment, the gaming device determines any outcome to provide to the player based on the number of associated or related symbols which are generated in active symbol positions on a requisite number of adjacent reels (i.e., not on paylines passing through any displayed winning symbol combinations). As discussed above, the player is provided an award, if any, for each string of related symbols generated in active symbol positions (i.e., as opposed to being based on how many paylines that would have passed through each of the strings of related symbols in active symbol positions).

As discussed above, in one embodiment, the bonus event triggering event is not based on any event displayed in any of the plays of any primary games. That is, the bonus game is provided to a player without any explanation or alternatively with simple explanations. In another embodiment, the triggering of the bonus game is at least partially based on a game event, such as a symbol-driven trigger, and at least partially based on a non-game play, random event.

In other embodiments, the triggering of the bonus game is based on exceeding a certain amount of game play (such as number of games, number of credits, or amount of time), or reaching a specified number of points earned during game play.

In another embodiment, the triggering of the bonus game is based on time. In this embodiment, a time is set for when the bonus game will be triggered. In another embodiment, the triggering of the bonus game is based on a predefined variable reaching a defined parameter threshold. In different embodiments, the predefined parameter thresholds include a length of time, a length of time after a certain dollar amount is hit, a wager level threshold for a specific device (which gaming device is the first to contribute $50,000), a number of gaming devices active or any other parameter that would define a threshold for triggering a bonus game. In another embodiment, the triggering of the bonus game occurs after a random number of plays in with a bonus game has not been triggered.

In another embodiment, the triggering of the bonus game is based upon gaming system operator defined player eligibility parameters stored on a player tracking system (such as via a player tracking card or other suitable manner). In another embodiment, the triggering of the bonus game is based upon gaming system operator defined player eligibility parameters stored on a player tracking system (such as via a player tracking card or other suitable manner).

In another embodiment, the triggering of the bonus game includes a system determination which is based on a random selection by the central controller. In one embodiment, the central controller tracks ail active gaming devices and the wagers they placed. Each gaming device has its own entry defining its state as either active or inactive and also defining the values of the wagers from that gaming device. In one embodiment, active status means that the gaming device is being actively played by a player and enrolled/inactive status means that the gaming device is not being actively played by a player. The active status requirements can be based on any suitable number of satisfied criteria or defined in any suitable mariner by the implementer of the gaming system. For instance, a play of or wager on the primary game of the gaming device within a predetermined period of time may be part of the determination of whether that gaming device is in the active status. Other factors such as: (a) the amount of time between each play of or wager on the primary game of the gaming device; (b) the amount being wagered on the primary game(s); and (c) the number of plays within a period of time, may also or alternatively be part of the determination of whether a gaming device is in the active status; (d) the existence of credits on the gaming device may also or alternatively be part of the determination of whether a gaming device is in the active status. On the other hand, inactive status means that the gaming device is one of the gaming devices in the gaming system, but is not in the active status (i.e., not being actively played by a player according to one or more of the predetermined criteria).

In one embodiment, a central controller and an individual gaming device work in conjunction with each other to determine when to trigger the bonus game. In one embodiment, an individual gaming device may determine when to trigger the bonus game. In another embodiment, an individual gaming device may determine when to trigger at least one bonus game and the central controller determines when to trigger at least one bonus game.

In another embodiment, the central controller determines, in cooperation with the gaming device, when to trigger a bonus game by utilizing one or more random number generators. In this embodiment, the central controller determines when to trigger a bonus game by determining if any numbers allotted to a gaming device match a randomly selected number. In one such embodiment, upon or prior to each play of each gaming device, a random number is selected from a range of numbers and during each primary game, the gaming device allocates the first N numbers in the range, where N is the number of credits bet by the player in that primary game. At the end of the primary game, the randomly selected number is compared with the numbers allocated to the player and if a match occurs, that particular gaming device triggers a bonus game.

In one embodiment, an individual gaming device may trigger a bonus game for example through a game play event or game specific function, such as a symbol-driven trigger. In such an embodiment, the bonus game provided is a direct result of a game outcome generated on one of the gaming devices. That is, providing the bonus game is triggered by an event in or based specifically on one or more plays of any primary game of one or more of the gaming devices in the gaming system. In one embodiment, the central sever determines the symbol combination which will trigger a bonus game for the specific are played. In one embodiment, an individual gaming device determines the symbol combination which will trigger a bonus game for the specific game played and the gaming device communicates such determined symbol combination to the central server. In this embodiment, the gaming device determines the symbol combination based on the central server determined parameters set forth for the specific game played. In these embodiments, the central server displays the determined symbol combination on one or more signs associated with that bonus game.

It should be appreciated that any suitable manner of triggering a bonus game may be implemented with the gaming system disclosed herein. It should also be appreciated that any suitable manner of implementing the triggered bonus game to a player may be incorporated in the gaming system disclosed herein. That is, any suitable primary game or secondary game may be utilized as the bonus game to provide a player of one or more gaming devices with one or more awards. In different embodiments, the bonus game may incorporate any of the types of games described herein, as well as any suitable puzzle-type game, any suitable persistence game, any suitable wheel game, any suitable selection game, any suitable offer and acceptance game, any suitable cascading symbols game, any suitable ways to win game, any suitable scatter pay game, any suitable group game or any other suitable type of game.

Information Provided to Player

As indicated above, the bonus game may be provided to one or more players of the gaming machines with or without explanation or information provided to the player(s), or alternatively information can be displayed to the player(s). In one embodiment, suitable information about the bonus game and awards, such as progressive awards, can be provided to the players through one or more displays on the gaming machines or additional information displays positioned near the gaming machines, such as above a bank of system gaming machines. In one embodiment, a metering and/or information display device may be used to display information regarding the bonus game and awards. This information can be used to entertain the player or inform the player that a bonus game award triggering event has occurred or will occur. Examples of such information are:

(1) that a bonus game triggering event has occurred;

(2) that a bonus game triggering event will shortly occur;

(3) that one or more bonus games have been provided to one or more players of the system gaming machines;

(4) which gaming machines have won the progressive awards;

(5) the amount of the progressive awards won;

(6) the highest progressive award won;

(7) the lowest progressive award won;

(8) the average progressive award won;

(9) number of games played/total time since the last progressive award was won;

(10) the number of progressive awards won in a designated time period;

(11) the upper limit or range which one or more progressive awards can increment to; and

(12) an average amount of time between each progressive award being won.

It should be understood that various changes and modifications to the presently preferred embodiments described herein wilt be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device that stores a plurality of instructions which, when executed by the at least one processor, cause the at least one processor to operate with the at least one display device and the at least one input device to:

(a) enable a player to place one of a plurality of different wager amounts on a play of a primary game;

(b) select one of a plurality of different bonus trigger probability levels based on the placed wager amount, each bonus trigger probability level being associated with a probability of occurrence of a bonus trigger event, at least two of the bonus trigger probability levels being associated with different probabilities of occurrence of the bonus trigger event;

(c) determine whether to trigger a bonus based on the probability of occurrence of the bonus trigger event associated with the selected bonus trigger probability level; and (d) if it is determined to trigger the bonus:

(i) display one or more plays of a bonus game;

(ii) accumulate a quantity of points during said one or more plays of the bonus game; and (iii) upon conclusion of said one or more plays of the bonus game, if the accumulated quantity of points is at least a designated quantity, provide the player a designated bonus award, wherein a probability of providing the designated bonus award increases as the placed primary game wager amount increases.

2. The gaming system of claim 1, wherein the plurality of instructions, when executed by the at least one processor, cause the at least one processor to, if it is determined to trigger the bonus, provide an initial quantity of points, the accumulated quantity of points including the provided initial quantity of points and any points accumulated during said one or more plays of the bonus game.

3. The gaming system of claim 2, wherein the plurality of instructions, when executed by the at least one processor, cause the at least one processor to determine the initial quantity of points based on the placed wager amount.

4. The gaming system of claim 3, wherein each of the wager amounts is associated with one of a plurality of different initial quantities of points.

5. The gaming system of claim 4, wherein a first one of the wager amounts is associated with a first one of the initial quantities of points and a second, higher one of the wager amounts is associated with a second, higher one of the initial quantities of points.

6. The gaming system of claim 1, wherein the plurality of instructions, when executed by the at least one processor, cause the at least one processor to, if it is determined to trigger the bonus, determine the designated quantity based on the placed wager amount.

7. The gaming system of claim 6, wherein each of the wager amounts is associated with one of a plurality of different designated quantities.

8. The gaming system of claim 7, wherein a first one of the wager amounts is associated with a first one of the designated quantities and a second, higher one of the wager amounts is associated with a second, lower one of the designated quantities.

9. A method of operating a gaming system, said method comprising:

(a) enabling a player to place one of a plurality of different wager amounts on a play of a primary game;

(b) causing at least one processor to execute a plurality of instructions stored in at least one memory device to select one of a plurality of different bonus trigger probability levels based on the placed wager amount, each bonus trigger probability level being associated with a probability of occurrence of a bonus trigger event, at least two of the bonus trigger probability levels being associated with different probabilities of occurrence of the bonus trigger event;

(c) causing the at least one processor to execute the plurality of instructions to determine whether to trigger a bonus based on the probability of occurrence of the bonus trigger event associated with the selected bonus trigger probability level; and (d) if it is determined to trigger the bonus:

(i) causing the at least one processor to execute the plurality of instructions to operate with at least one display device to display one or more plays of a bonus game;

(ii) causing the at least one processor to execute the plurality of instructions to accumulate a quantity of points during said one or more plays of the bonus game; and (iii) upon conclusion of said one or more plays of the bonus game, if the accumulated quantity of points is at least a designated quantity, providing the player a designated bonus award, wherein a probability of providing the designated bonus award increases as the placed primary game wager amount increases.

10. The method of claim 9, which includes, if it is determined to trigger the bonus, providing an initial quantity of points, the accumulated quantity of points including the provided initial quantity of points and any points accumulated during said one or more plays of the bonus game.

11. The method of claim 10, which includes causing the at least one processor to execute the plurality of instructions to determine the initial quantity of points based on the placed wager amount.

12. The method of claim 11, wherein each of the wager amounts is associated with one of a plurality of different initial quantities of points.

13. The method of claim 12, wherein a first one of the wager amounts is associated with a first one of the initial quantities of points and a second, higher one of the wager amounts is associated with a second, higher one of the initial quantities of points.

14. The method of claim 9, which includes causing the at least one processor to execute the plurality of instructions to, if it is determined to trigger the bonus, determine the designated quantity based on the placed wager amount.

15. The method of claim 14, wherein each of the wager amounts is associated with one of a plurality of different designated quantities.

16. The method of claim 15, wherein a first one of the wager amounts is associated with a first one of the designated quantities and a second, higher one of the wager amounts is associated with a second, lower one of the designated quantities.

17. The method of claim 9, which is provided through a data network.

18. The method of claim 17, wherein the data network is an internet.

19. A non-transitory computer readable medium storing a plurality of instructions which, when executed by at least one processor, cause the at least one processor to:

(a) enable a player to place one of a plurality of different wager amounts on a play of a primary game;

(b) select one of a plurality of different bonus trigger probability levels based on the placed wager amount, each bonus trigger probability level being associated with a probability of occurrence of a bonus trigger event, at least two of the bonus trigger probability levels being associated with different probabilities of occurrence of the bonus trigger event;

(c) determine whether to trigger a bonus based on the probability of occurrence of the bonus trigger event associated with the selected bonus trigger probability level; and (d) if it is determined to trigger the bonus:

(i) cause at least one display device to display one or more plays of a bonus game;

(ii) accumulate a quantity of points during said one or more plays of the bonus game; and (iii) upon conclusion of said one or more plays of the bonus game, if the accumulated quantity of points is at least a designated quantity, provide the player a designated bonus award, wherein a probability of providing the designated bonus award increases as the placed primary game wager amount increases.

20. The non-transitory computer readable medium of claim 19, wherein the plurality of instructions, when executed by the at least one processor, cause the at least one processor to, if it is determined to trigger the bonus, provide an initial quantity of points, the accumulated quantity of points including the provided initial quantity of points and any points accumulated during said one or more plays of the bonus game.

21. The non-transitory computer readable medium of claim 20, wherein the plurality of instructions, when executed by the at least one processor, cause the at least one processor to determine the initial quantity of points based on the placed wager amount.

22. The non-transitory computer readable medium of claim 21, wherein each of the wager amounts is associated with one of a plurality of different initial quantities of points.

23. The non-transitory computer readable medium of claim 22, wherein a first one of the wager amounts is associated with a first one of the initial quantities of points and a second, higher one of the wager amounts is associated with a second, higher one of the initial quantities of points.

24. The non-transitory computer readable medium of claim 19, wherein the plurality of instructions, when executed by the at least one processor, cause the at least one processor to, if it is determined to trigger the bonus, determine the designated quantity based on the placed wager amount.

25. The non-transitory computer readable medium of claim 24, wherein each of the wager amounts is associated with one of a plurality of different designated quantities.

26. The non-transitory computer readable medium of claim 25, wherein a first one of the wager amounts is associated with a first one of the designated quantities and a second, higher one of the wager amounts is associated with a second, lower one of the designated quantities.

* * * * *

UNITED STATES PATENT AND TRADEMARK OFFICE

CERTIFICATE OF CORRECTION

PATENT NO. : 8,911,292 B2
APPLICATION NO. : 13/970149
DATED : December 16, 2014
INVENTOR(S) : Christopher T. Brune It is certified that error appears in the above-identified patent and that said Letters Patent is hereby corrected as shown below:

IN THE CLAIMS

In Claim 1, Column 33, Line 15, delete “primary game”.
In Claim 9, Column 34, Line 15, delete “primary game”.
In Claim 19, Column 35, Line 8, delete “primary game”.

Signed and Sealed this
Twentieth Day of October, 2015

Michelle K. Lee

Michelle K. Lee
*Director of the United States Patent and Trademark Office*